United States Patent [19]
Bussing

[11] Patent Number: 6,062,018
[45] Date of Patent: *May 16, 2000

[54] PULSE DETONATION ELECTRICAL POWER GENERATION APPARATUS WITH WATER INJECTION

[75] Inventor: Thomas R. A. Bussing, Issaquah, Wash.

[73] Assignee: Adroit Systems, Inc., Bellevue, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/646,022

[22] Filed: May 7, 1996

Related U.S. Application Data

[63] Continuation-in-part of application No. 08/205,505, Mar. 14, 1994, Pat. No. 5,513,489, which is a continuation-in-part of application No. 08/045,771, Apr. 14, 1993, Pat. No. 5,345,758, which is a continuation-in-part of application No. 08/613,194, Mar. 8, 1996, Pat. No. 5,855,827.

[51] Int. Cl.⁷ .................................................. F02C 5/02
[52] U.S. Cl. ................ 60/39.39; 60/39.181; 60/39.182; 60/39.55
[58] Field of Search .............. 60/39.38, 39.39, 60/39.76, 39.78, 39.79, 39.8, 39.821, 39.826, 39.827, 39.58, 39.59, 39.53, 39.181, 39.182, 39.19, 267, 266, 730; 431/1, 158, 278, 280

[56] References Cited

U.S. PATENT DOCUMENTS

| | | | |
|---|---|---|---|
| 1,552,272 | 9/1925 | Carner | 60/39.39 |
| 2,168,313 | 8/1939 | Bichowsky | 60/39.553 |
| 2,515,644 | 7/1950 | Goddard | 60/39.77 |
| 2,557,198 | 6/1951 | Nichols | 60/39.39 |
| 2,579,321 | 12/1951 | Kadenacy | 60/39.39 |
| 2,770,097 | 11/1956 | Walker | 60/39.58 |
| 2,942,412 | 6/1960 | Bollay | 60/39.77 |
| 3,473,879 | 10/1969 | Berberich | 60/39.76 |
| 3,954,380 | 5/1976 | Valaev et al. | 60/39.77 |

(List continued on next page.)

OTHER PUBLICATIONS

Eager, Thomas W., "Bringing New Materials to Market," *Technology Review*, Feb./Mar. 1995, vol. 98, No. 2, pp. 43–49.

Kodas, Toivo T., et al., "Alumina Powder Production by Aerosol Processes," *Science and Technology Handbook; Alumina Chemicals*, L.D. Hart editor, The American Ceramic Society, Inc., Westerville, OH, 1990.

(List continued on next page.)

*Primary Examiner*—Ted Kim
*Attorney, Agent, or Firm*—David R. Yohannan; Collier, Shannon, Rill & Scott, PLLC

[57] ABSTRACT

A pulse detonation power generation apparatus is provided. This apparatus is provided with a detonation chamber connected to fuel and air sources which detonate to produce energy which may be converted to electrical energy. The pulse detonation energy generator may have one or more detonation chambers, each having an inlet end and an outlet end; a fuel manifold for supplying fuel from a fuel source to said generator; an air manifold for supplying air to said generator; a pre-mixer operatively connected to said fuel manifold, air manifold, and the inlet end of said one or more detonation chambers; an impingement ring disposed along an internal wall of said pre-mixer; a disk valve positioned between the pre-mixer and the air manifold; a predetonator for initiating detonation in said detonation chambers; a rotary valve for pulse feeding an oxidizer or fuel to the predetonator; means for injecting liquid water or steam into combustion products produced in said detonation chambers; and means for converting the energy generated by a detonation in said detonation chambers into electrical energy.

8 Claims, 13 Drawing Sheets

U.S. PATENT DOCUMENTS

| | | | |
|---|---|---|---|
| 4,069,672 | 1/1978 | Milling | 60/618 |
| 4,570,438 | 2/1986 | Lorenz | 60/39.39 |
| 4,583,362 | 4/1986 | Wagner | 60/267 |
| 4,669,658 | 6/1987 | Nevgod et al. . | |
| 4,687,135 | 8/1987 | Nevgod et al. . | |
| 4,693,075 | 9/1987 | Sabatiuk | 60/39.39 |
| 4,741,154 | 5/1988 | Eidelman | 60/39.34 |
| 4,902,539 | 2/1990 | Jackson . | |
| 5,052,619 | 10/1991 | Ulyanitsky et al. . | |
| 5,073,433 | 12/1991 | Taylor . | |
| 5,185,211 | 2/1993 | Sue et al. . | |
| 5,242,753 | 9/1993 | Sue et al. . | |
| 5,267,437 | 12/1993 | Foust | 60/206 |
| 5,345,758 | 9/1994 | Bussing | 60/39.39 |
| 5,353,588 | 10/1994 | Bussing | 60/39.39 |
| 5,513,489 | 5/1996 | Bussing | 60/39.39 |
| 5,579,631 | 12/1996 | Chen et al. | 60/39.59 |

OTHER PUBLICATIONS

Lyons, Shirley W., et al., "Multicomponent Ceramic Powder Generation by Spray Pyrolysis," *Better Ceramics Through Chemistry V, Mat. Res. Soc. Symp. Proc. vol. 271*, ed., Mark J. Hampden–Smith, Walter G. Klemperer, C. Jeffrey Brinker, Apr. 27–May 1, 1002, San Francisco, CA.

Opall, B., "BMDO Request Increases to 2000," *Space News* Feb. 13–19, 1995, p. 17.

Perry, Robert H., et al., Chemical Engineers' Handbook, Fifth Edition, McGraw–Hill Book Company, New York, 1973, pp. 20–78 to 20–87.

Avalone, Eugene A., et al., *Marks' Standard Handbook for Mechnical Engineers*, Ninth Ed., McGraw–Hill Book Co., New York, 1987, pp. 6–172.

Borisov, A.A., et al. "Ignition of Dust Suspensions Behind Shock Waves," *Dynamics of Shock Waves, Explosions, and Detonations*, vol. 94, AIAA Progress in Astronautics and Aeronautics, 1984.

Che, et al., "Microstructures of SiCp/MR64 Composite prepared by Detonation–Gaseous Spray Deposition of Mechanically Alloyed Powder," *Scripta Metallurgica et Materialia*, vol. 31, No. 1, pp. 43–46, 1994.

The Committee on Ceramic Processing, Materials Advisory Board, Division of Engineering, National Research Council, "Ceramic Processing," Publication 1576, National Academy of Sciences, Washington, D.C., 1968.

Cook, Lawrence P., "Phase Equilibria of Alumina," *Science and Technology Handbook: Alumina Chemicals*, L.D. Hart editor, The American Ceramic Society, Inc., Westerville, OH, 1990, pp. 49–61.

Glassman, Irvin, *Combustion*, Academic Press, Inc., San Diego, 1987.

Khasainov, B.A., et al., "Effect of Losses on the Existence of Non–ideal Detonations in Hybrid Two–Phase Mixtures," *Dynamic Aspects of Detonations AIAA, Progress in Astronautics and Aeronautics*, vol. 153, 1993, pp. 447–461.

Koller A., *Structure and Properties of Ceramics*, Elsevier, Amsterdam, 1994, p. 438.

"Market Share Reporter," 1994, pp. 868, 875–876.

Richerson, David W., *Modern Ceramic Engineering: Properties, Processing, and Use in Design*, Marcel Deckker, Inc., New York, 1982.

Shaw, K.G., et al., "Fabrication of Composite Spray Powders Using Reaction Synthesis," *Proceedings of the 7th National Thermal Spray Conference*, Jun. 20–24, 1994, Boston MA, pp. 509–514.

Sutton, George P., *Rocket Propulsion Elements: An Introduction to the Engineering of Rockets*, Fifth Edition, John Wiley & Sons, New York, 1986, pp. 295–296.

Veyssiere, B., et al., "A Model for Steady, Plane, Double–Gront Detonations (DFD) in Gaseous Explosive Mixtures with Aluminum Particles in Suspension," *Combustion and Flame*, vol. 85, 1991, pp. 241–253.

Veyssiere, B., "Ignition of Aluminum Particles in a Gaseous Detonation," *Dynamics of Explosions, AIAA Progress in Astronautics and Aeronautics*, vol. 114, 1988, pp. 363–375.

Veyssiere, B., "Structure of the Detonations in Gaseous Mixtures Containing Aluminum Particles in Suspension," *Dynamics of Explosions AIAA Progress in Astronautics and Aeronautics*, vol. 106, 1986, pp. 522–543.

Veyssiere, B., "Double–Front Detonations in Gas–Solid Particles Mixtures" *Dynamics of Shock Waves, Explosions, and Detonations, AIAA Progress in Astronautics and Aeronautics*, vol. 94, 1984.

Veyssiere, B., et al., "Detonation characteristics of two ethylene–oxygen–nitrogen mixtures containing aluminum particles in suspension," *Gasdynamics of Detonations and Explosions, AIAA Progress in Astronautics and Aeronautics*, vol. 75, pp. 423–438, 1981.

Wolanski, P., "Deflagration and Detonation Combustion of Dust Mixtures," *Dynamics of Deflagrations and Reactive Systems: Heterogeneous Combustion. AIAA Progress in Astronautics and Aeronautics*, vol. 132, pp. 3–31, 1993.

Helman, D. et al. "Detonation Pulse Engine", AIAA 86–1683, pp. 1–23, Jun. 1986.

PULSE DETONATION ELECTRICAL POWER GENERATION APPARATUS WITH WATER INJECTION

CROSS REFERENCE TO RELATED APPLICATIONS

This application is a continuation-in-part of both prior U.S. application Ser. No. 08/205,505, filed Mar. 14, 1994, now U.S. Pat. No. 5,513,489 which was continuation-in-part of Ser. No. 08/045,771, filed Apr. 14, 1993, now U.S. Pat. No. 5,345,758 issued Oct. 11, 1994; and U.S. patent application Ser. No. 08/613,194 filed Mar. 8, 1996 is now U.S. Pat. No. 5,855,827 for "Pulse Detonation Synthesis" (Attorney Docket No. 34110-00613).

BACKGROUND OF THE INVENTION

The present invention relates to energy generation in which energy generated by detonating fuel, air and/or oxidant can be converted to electrical energy. In particular, the present invention combines a combustion chamber coupled to an air inlet and a fuel source and a means for converting the energy of the detonation into electrical energy.

Many researchers have encountered difficulties in attempting to study and characterize the performance of pulsed detonation devices. Some investigators have attempted to initiate detonation in mixtures with insufficient amounts of energy, and have therefore unwittingly created deflagrative burning devices. Typically, detonation was not achieved at all, or was achieved only after a lengthy transition from a deflagration.

Unsteady pulse deflagration combustors have been under investigation for some time, but as of yet these devices have failed to provide enough of a performance gain over typical steady state combustors to warrant wide spread research, development, and commercialization. The pulse detonation combustor of the present invention not only significantly out-performs the prior art devices, but also benefits greatly from related pulse detonation efforts by Applicant underway in other fields.

A focused research and development program is underway by the Applicant to successfully commercialize several applications for pulse detonation combustion. A majority of the effort has been focused in the areas of aerospace propulsion and materials science. Patent applications have been filed and/or patents have issued for these inventions. Specifically, U.S. application Ser. No. 08/205,505, now U.S. Pat. No. 5,513,489, and U.S. application Ser. No. 08/613,194, filed Mar. 8, 1996, are incorporated by reference along with all information and references contained therein.

A novel, patented multiple tube engine concept has been developed for airbreathing propulsion applications. Applicant's design allows the system to operate at higher cycle frequencies and lower inlet losses than previous concepts. It consists of several PDE combustors or detonation chambers coupled to an air inlet and fuel source via a rotary valve. The valve serves to isolate the steady operation of the air inlets and fuel systems from the unsteady nature of the detonation process. The rotary valve allows some of the PDE combustion chambers to be fueled while detonation occurs in other PDE combustors. In this way, the fueling system can operate in a steady state mode in conjunction with an unsteady combustion process. Detonation initiation occurs through a co-located fuel/oxygen pre-detonation zone located at the top of each combustor.

Intermittent combustion engines in the form of pulse jet engines, such as those in U.S. Pat. No. 2,930,196 to Hertzberg, et al., U.S. Pat. No. 2,515,644 to Goddard, and U.S. Pat. No. 3,008,292 to Logan, are known. Pulse combustion in these prior art engines is deflagrative in nature. A deflagration combustion process results in propagation velocities on the order of a few meters per second while detonative combustion results in propagation velocities on the order of several thousands of meters per second. The use of a detonation combustion process in an engine has been suggested. For example, U.S. Pat. No. 4,741,154 to Eidelman shows a rotary engine using a detonation process.

Other gas based combustion systems for gas turbine applications include steady state combustors and pulse deflagrative combustors. Conventional steady state gas burners have been in use for years and have been described extensively in the literature. These devices are well understood and have proven reliable and efficient.

Pulse deflagration combustion systems are described extensively in the literature for various applications. Recent efforts have concentrated on transferring the technology to gas turbine applications. The pulse combustors developed thus far have relied on deflagrative combustion principles. Pulse combustor devices have demonstrated some of the inherent advantages of unsteady combustion which include: high combustion efficiency, high heat release, and low $NO_X$ production levels. The system described in this application is based on detonative combustion, which is significantly more efficient than deflagration combustion.

SUMMARY OF THE INVENTION

An innovative pulse detonation combustion system, which dramatically improves the efficiency of fuel/air combustion, is disclosed. The system may be used to combust fuels such as: coal, coal slurry, natural gas and other liquid hydrocarbons. Additional fuels may be combusted in the solid, liquid or gaseous state. Selection is only limited by a fuel's ability to detonate. The concept is based on detonative combustion, as opposed to deflagrative combustion which is used in conventional steady-state gas turbines and pulse combustors. In a preferred embodiment, water and/or steam may be introduced into the system to increase the power output.

Detonative combustion of the fuel/air mixture results in temperature and pressure gains that yield a substantial improvement in the thermodynamic cycle efficiency over that of deflagrative combustion. The efficiency gain would decrease fuel requirements by 15 to 30 percent, and result in a considerable savings of natural resources. In addition, there will be lower $NO_X$ formation during combustion. This is due to the rapid nature of detonative combustion and the short residence times of the species at high temperatures. The Pulse Detonative Combustor (PDC) could be used with a variety of fuels, including micronized coal, fuel oils, natural gas and the low/medium BTU gases produced by coal gasification.

OBJECTS OF THE INVENTION

It is an object of the present invention to provide a pulse detonation energy generator.

It is another object of the present invention to provide a pulse detonation energy generator with significant advantages over energy generation means in the prior art.

It is another object of the present invention to provide a method to substantially improve combustion thermal efficiency by approximately 15–30% as compared to current or projected combustors, such as steady state and pulse deflagrative combustors.

It is yet another object of the invention to provide a mechanically simple, compact, method of producing clean power.

Additional objects and advantages of the invention are set forth, in part, in the description which follows, and in part, will be obvious from the description or may be learned by practice of the invention. The objects and advantages of the invention will be realized in detail by means of the instrumentalities and combinations particularly pointed out in the appended claims.

DETAILED DESCRIPTION OF THE PREFERRED EMBODIMENTS

It is to be understood that both the foregoing general description and the following detailed description are exemplary and explanatory only, and are not restrictive of the invention as claimed. The accompanying drawings which are incorporated herein by reference, and constitute part of the specification, illustrate certain embodiments of the invention, and together with the detailed description serve to explain the principles of the present invention.

Reference will now be made in detail to several embodiments of the pulse detonation combustion system of the present invention. These examples are illustrative only and should not be construed to limit the invention unnecessarily.

Figure 1:
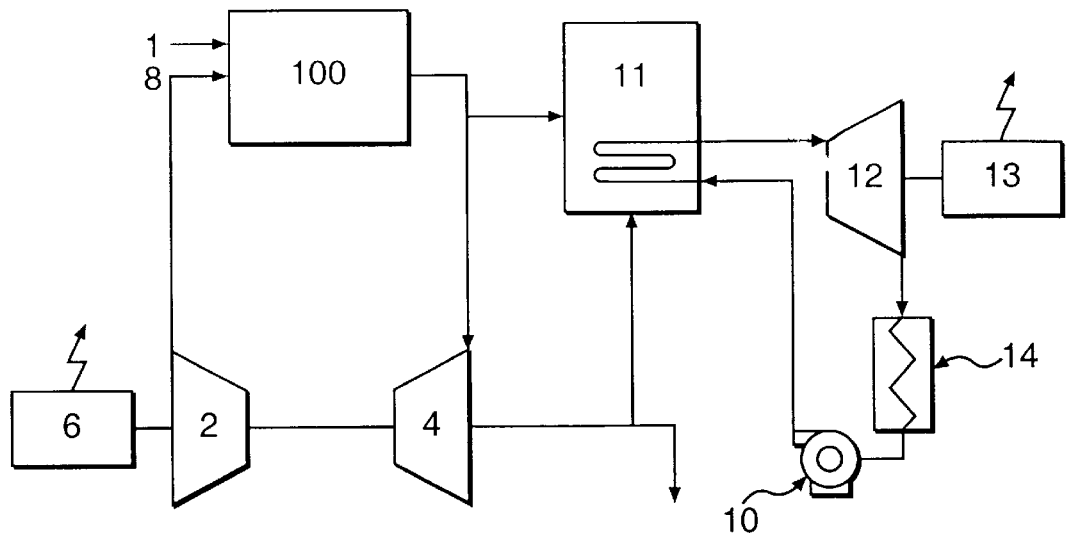
FIG. 1 is a block schematic diagram of one embodiment of the invention.

The pulse detonation combustor is envisioned as an integral component of a combined cycle power plant. As shown in the block schematic, FIG. 1, fuel, 1 and compressed air 8 from a compressor 2 enter the PDC 100, undergo detonative combustion, and the products are diverted to a turbine 4. Excess heat produced in the energetic detonation process can be recovered at several locations by a separate steam cycle, and the turbine 4 provides enough power to drive both the air compressor 2 and an electricity producing generator 6.

The separate steam cycle heat recovery is comprised of a feed water pump 10. and a heat exchanger 11. Steam exits the exchanger 11 and flows into a turbine 12. The turbine then drives an electric generator 13. The $H_2O$ is then returned through a condenser 14, to water pump 10.

The PDC is based on the idea of periodically initiating a detonation in a fuel/oxidizer mixture. Detonation combustion consists of a detonation wave characterized by a strong shock wave followed by a flame front. Detonation waves propagate at speeds of several thousand meters per second, while deflagration waves typically travel at several meters per second. The difference in combustion rate allows detonation combustion to occur as a nearly constant volume process characterized by a Humphrey cycle, whereas traditional deflagration combustion is a constant pressure process characterized by a Brayton cycle.

$$\eta_{BRAYTON} = 1 - \frac{T_1}{T_2} \quad \eta_{HUMPHREY} = 1 - \gamma \frac{T_1}{T_2} \left[ \frac{\left(\frac{T_3}{T_2}\right)^{\frac{1}{\gamma}} - 1}{\frac{T_3}{T_2} - 1} \right]$$

A comparison of Brayton and Humphrey cycle efficiency can be made using a representative detonation combustion process and approximating the ratio of specific heats ($\gamma$) as a constant over the cycle. For example, an equilibrium chemistry calculation for stoichiometric methane and air yields a detonation temperature ratio $T_3/T_2$ of 9.3 and specific heat ratios of 1.39 in the unburned gas and 1.17 in the burned gas. The Humphrey detonation cycle efficiency was calculated for average cycle $\gamma$'s of 1.39 and 1.17, which represent the upper and lower limits of the varying specific heat ratio.

Figure 2:
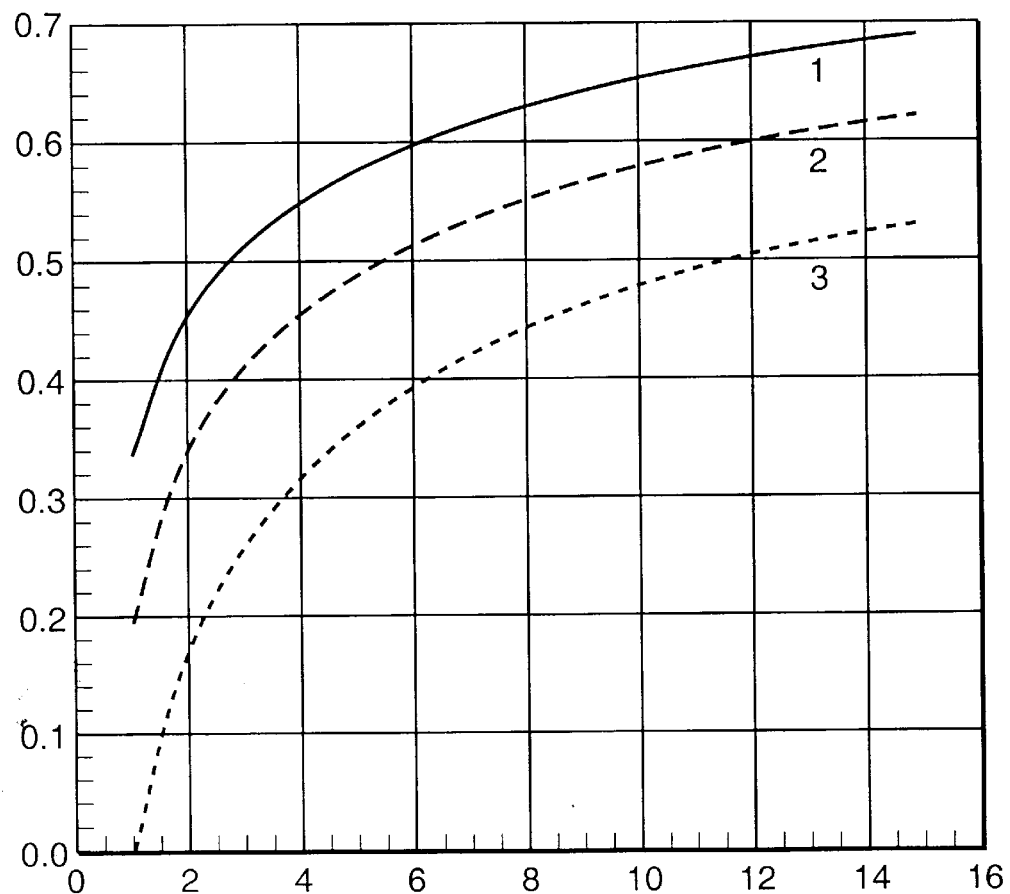
FIG. 2 is a graphical illustration of the thermal efficiency of Brayton isobaric and Humphrey detonation cycles.

FIG. 2 shows the thermal efficiency of Brayton Isobaric and Humphrey detonation cycles. The graph shows a calculation of cycle thermal efficiency (y-axis) as a function of compression ratio ($P_2/P_1$)(x-axis). The actual detonation cycle efficiency would lie somewhere between the two limiting detonation curves 1, $\gamma=1.39$, 2, $\gamma=1.17$ and 3 Brayton). The constant volume detonation process clearly offers a significant improvement in efficiency as compared to the isobaric combustion cycle. At a compression ratio of 6, for example, the constant volume process offers a 29 to 51 percent improvement in thermal efficiency over the constant pressure cycle.

Note that several new and proposed systems operate between constant pressure and constant volume combustion but do not match the gains expected from a detonation-based combustion system. The pulse detonative combustion cycle provides a larger improvement over the standard constant pressure cycle than does pulse deflagrative combustion, which provides an efficiency increase due to a resonance driven pressure gain, but which can only approximate the efficiency increase of true constant volume combustion.

Detonative combustion is characterized by a detonation wave comprised of a strong shock wave followed by a closely coupled flame front. A brief ignition delay occurs after the passage of the leading shock until the onset of the chemical reactions. A rarefaction trails the detonation wave, slowing the gaseous products so that they may satisfy the closed-end wall boundary condition.

Figure 3:
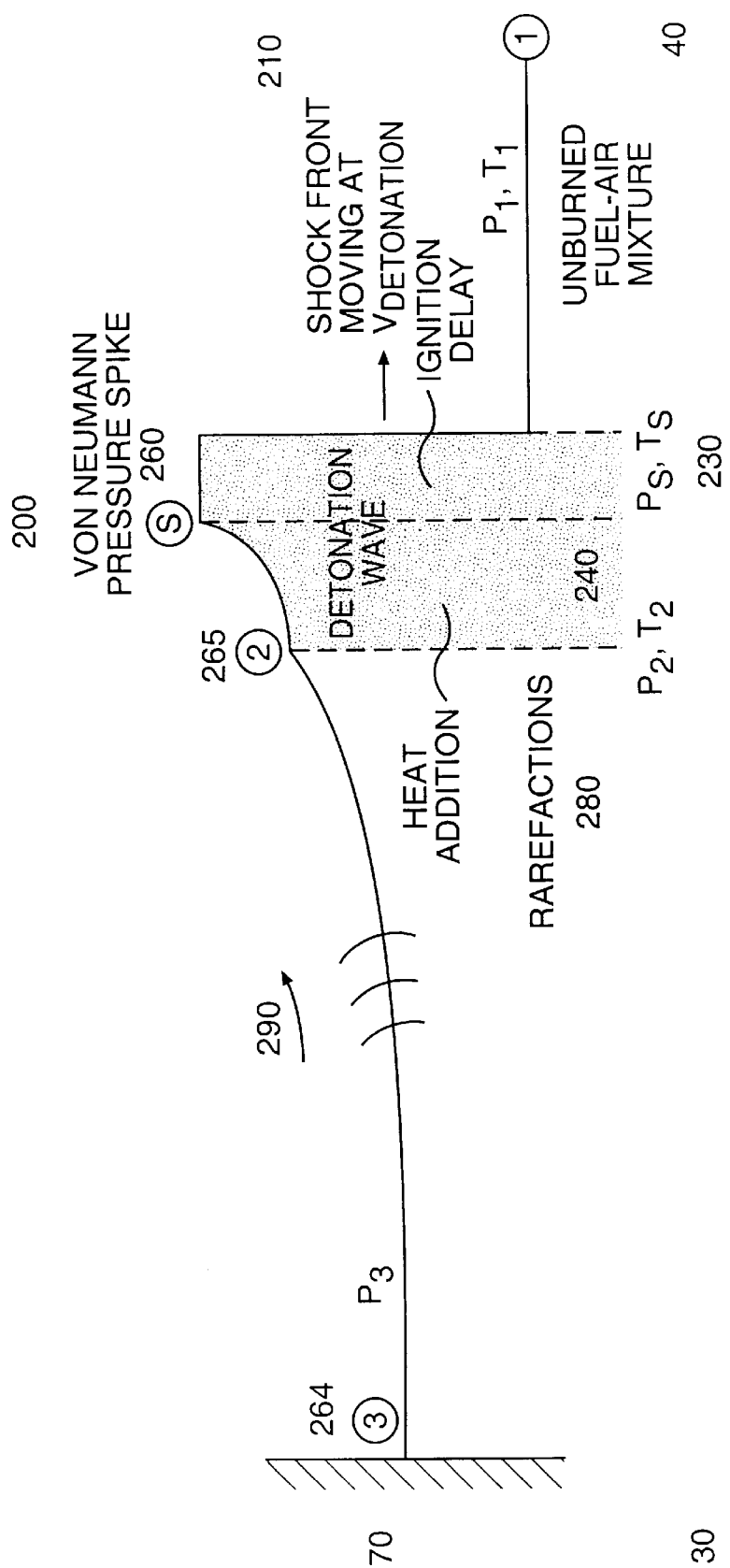
FIG. 3 is a detonation chamber pressure profile.

FIG. 3 depicts the pressure distribution within a detonation chamber of a PDC 100 with one end closed 30 and one end open 40. As shown in FIG. 3, detonation has been initiated at the closed end 30 and is propagating toward the open end 40. In a preferred embodiment of the present invention, the valved end of the combustor tube is closed during detonation. It will be apparent to those skilled in the art that various modifications and variations can be made in closing or opening the ends of the combustor tube of the present invention, without departing from the scope or spirit of the invention.

The detonation wave 200 of the present invention can be modelled as a strong shock wave 210 which triggers combustion and a thin flame front 220 in which heat addition occurs, just behind the shock front. The shock front 210 moves at a detonation velocity, $V_{Detonation}$, relative to the gas and increases the pressure and temperature of the gas from its previous values of $P_1$ and $T_1$. The region of unburned gas just behind the shock is a stable high pressure region 230 known as the von Neumann spike. This region represents the ignition delay. Its thickness is dictated by the chemical kinetics of the detonation. The duration of the spike 230 with respect to a fixed point is very short, on the order of one microsecond.

Once the chemical reaction kinetics are initiated, heat is added to the flow 240. As a result, the temperature increases and the pressure decreases. The thickness of the heat addition region 240 is determined by the time required to complete the combustion reaction. At that point, the burned gas 280 is in State 2. In accordance with a detonative process, the temperature, pressure, and density at State 2 are significantly greater than at State 1.

The pressure and density in the stable detonation wave ($P_2$, $\rho_2$) are significantly lower than in the von Neumann region 230 between the shock front 210 and the chemical reaction zone 290. The detonation wave temperature ($T_2$) just after the flame region 240 is significantly higher than in the von Neumann spike 230.

In closed tube detonations, an expansion region 290 exists behind the heat addition region 240. Rarefaction waves 250 emanate from the closed end 30 in order to ensure that the normal velocity at the wall is zero. As a result of the expansion, most of the burned gas in the detonation tube is at a pressure, $P_3$, which is significantly lower than the pressure just behind the detonation wave 200 ($P_2$).

The pulse detonation cycle of a PDC 100 of the present invention is depicted in FIGS. 4a–4d. The pulse detonation process of the present invention is preferably conducted in several discrete steps:
1. A detonation combustion chamber is filled with reactants to be combusted and an easily detonable mixture (the easily detonable mixture is referred to as the "initiation mixture");
2. Detonation is initiated at the closed end 30 of the combustor 20 within the initiation mixture;
3. The detonation wave 200 propagates through the initiation mixture into the reactant mixture and exits at the open end; and
4. The burned gases in the combustor 20 exhaust through a blowdown process.

When the conditions within the combustor 20 reach a specified state, the combustor 20 is recharged with a fresh detonable mixture, and the cycle is repeated. This process is depicted through one complete cycle in FIG. 5.

Figure 4:
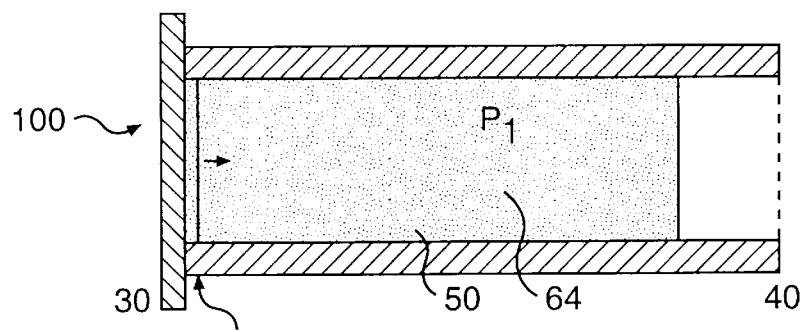
FIG. 4 is an illustration of sequence of events which takes place within the detonation chamber.
Figure 4:
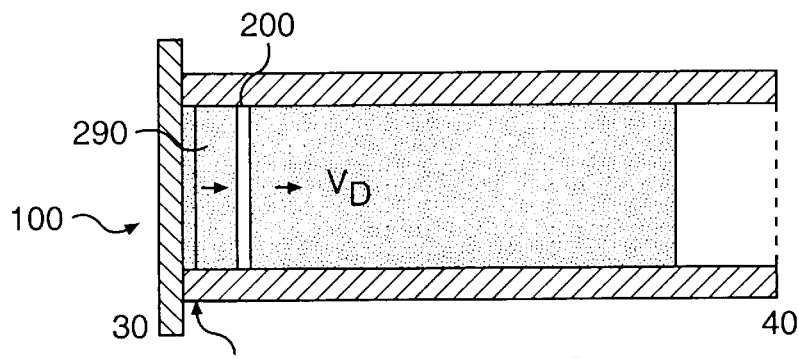
Figure 4:
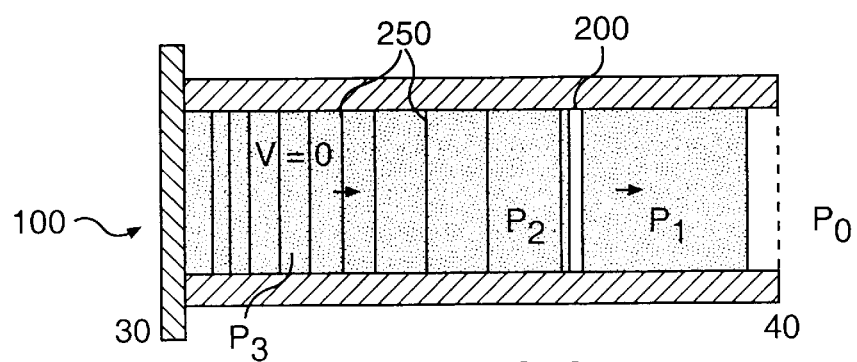
Figure 4:
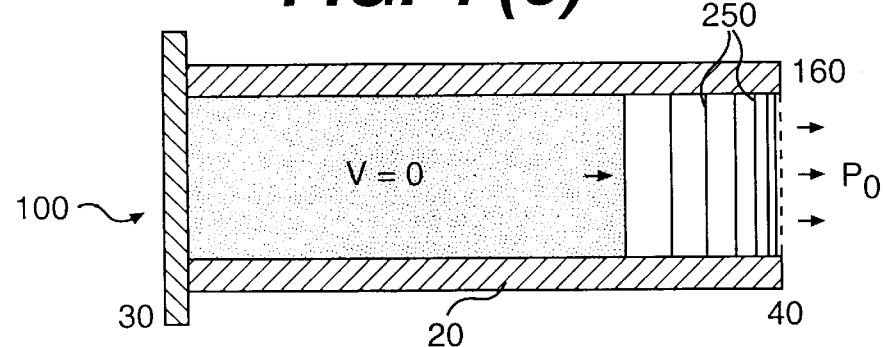

As shown in FIG. 4, after the fuel/oxidizer mixture 64 enters the chamber 50, a valve at the end 30 of the combustion chamber 50 is closed in preparation for detonation initiation. The valve seals the chamber 50 when the downstream fuel/oxidizer mixture 64 is still at some finite distance from the end of the chamber exit 40. The valve timing ensures that the fuel/oxidizer mixture 64 and the detonation wave 200 reach the chamber exit 40 simultaneously. This prevents any of the unburned mixture from escaping. As illustrated in FIG. 4a, the degree to which the detonation tube is filled with fuel/oxidizer 64 is calculated from the overall length of the tube and the relative velocities of the injected fuel/oxidizer mixture 64 and detonation wave 200.

After the valve is closed, a detonation wave 200 is initiated immediately in the fuel/oxidizer mixture 64 near the closed end 30 of the chamber 50, as shown in FIG. 4b. An expansion zone 290 is created between the closed end 30 and the detonation wave 200. Rarefaction waves 250 are generated at the closed end 30 of the detonation chamber 50 and proceed toward the exit 40 as shown in FIG. 4b. The rarefactions 250 originate at the closed end 30 and satisfy the constraint of zero axial fluid velocity normal to the wall. The strength of the expansion region 290 is a function of the axial velocity of the burned gases behind the detonation wave 200 which must be decelerated to satisfy the closed end boundary condition.

Ideally, a detonation wave 200 will proceed toward the open end of the chamber 40 at the Chapman-Jouguet detonation velocity, "VD", of the mixture shown in FIG. 3. The region ahead of the detonation will contain unburned gas 230 at State 1 260. Just behind the detonation wave 200, the burned gas 240 and 280 will be at a significantly higher temperature and pressure (State 2 265). The burned gas 280 near the closed end of the detonation tube 30 will be at State 3 264 which has a lower temperature and pressure than the burned gas 240 immediately behind the detonation (State 2 262). This is due to the expansion region 290, generated behind the detonation wave 200. As shown in FIG. 4d, the remainder of the burned gas 160, within the expansion region 190 between the detonation wave 200 and the closed end 40, will be at some intermediate condition.

When the detonation wave 200 exits the chamber 50, the chamber 50 contains burned gas (i.e., combustion products) at elevated temperatures and pressures. The pressure in the combustion chamber 50 increases from $P_3$ at the closed end 30 to $P_2$ at the open end 40. The axial velocity distribution varies accordingly from zero at the closed end 30, to potentially sonic values near the exit 40.

As the detonation wave 200 exits the chamber 50, a pressure differential exists at the open end 40. As shown in FIG. 4d, this pressure differential creates a series of rarefaction waves 250 which propagate into the tube, in the direction of the closed end 30 and expel the combustion products from the combustion chamber 50. This effect is depicted in FIG. 4d. The rarefaction waves 250 travel into the tube at the speed of sound of the combustor gas mixture. Initially, as the detonation wave 200 exits the detonation tube 20, the gas within most of the tube is at a pressure near $P_3$ and the velocity is nearly zero. An expansion process then accelerates the fluid toward the exit.

Figure 5:
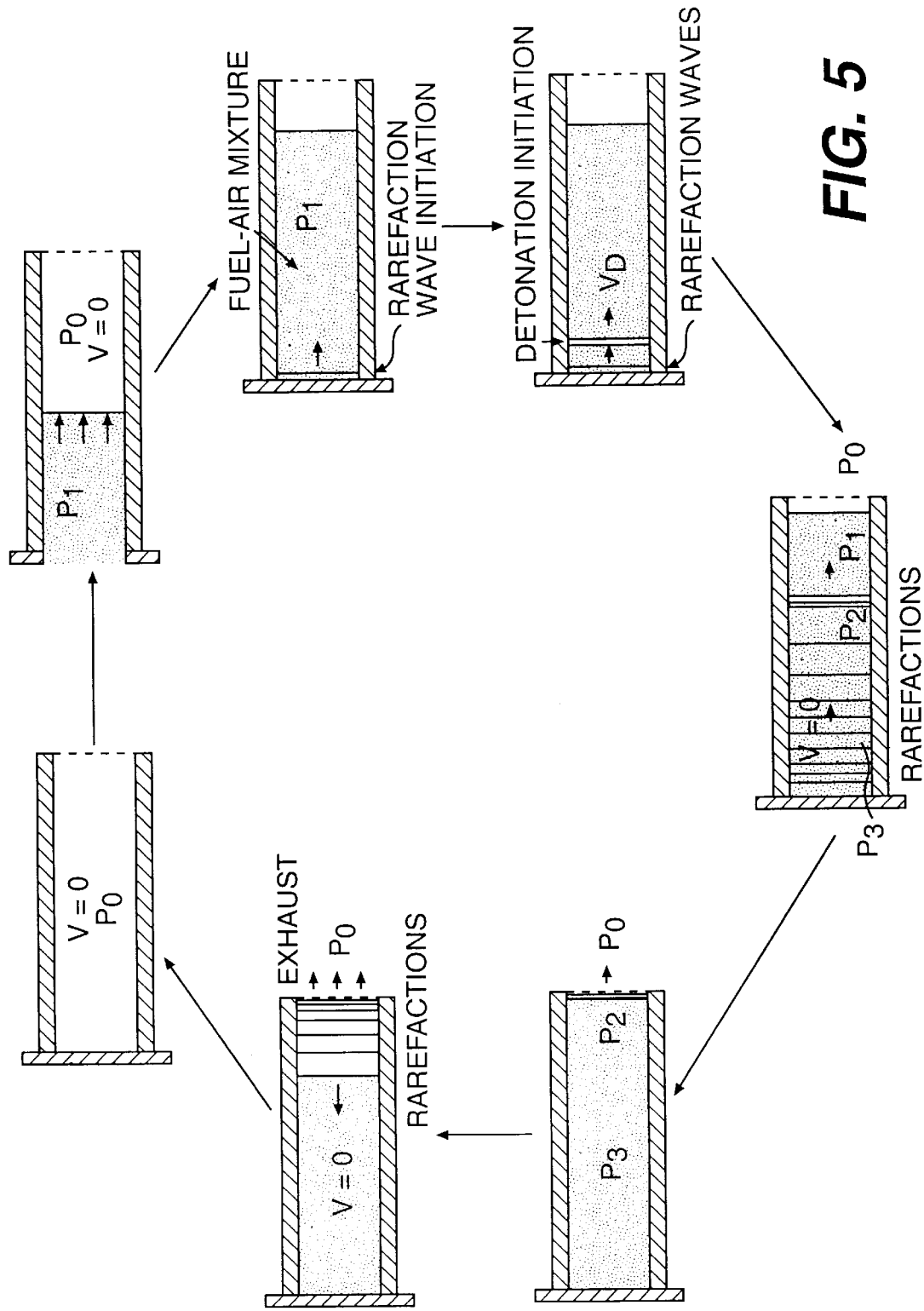
FIG. 5 is a summary of the detonation cycle.

As the gas in the detonation chamber 50 expands, as shown in FIG. 4d, the driving pressure differential along the chamber 50 diminishes. The unsteady blowdown process is characterized by a series of compression and rarefaction waves 250 which are alternately created and reflected. The blowdown process is preferably self-aspirating. The flow field at the combustor exit 40 alternates between outflow and inflow (i.e., reverse flow). The pressure and temperature eventually decay to ambient levels and the exhaust velocity eventually decays to zero. This process is also depicted in FIG. 5. The detonation cycle can be repeated when the pressure within the chamber falls below a specified injection pressure. At this point in the cycle, the combustion chamber 50 can be filled with a fresh fuel/oxidizer mixture 64 and the previously described detonation cycle can be restarted. FIG. 5 shows the sequence of events and phenomena that occur within the detonation tube 20 over an entire detonation cycle.

The hot gases, during operation of the device, expand out of the combustion chamber through a nozzle and progress through a conduit to a turbine, which generates electricity. If the temperature is excessive for optimal turbine operation, a heat exchanger is coupled to this conduit to transfer some of the heat to steam. A steam turbine can then be utilized to recover useful energy from the steam. A similar device is used to capture any heat remaining in the exhaust gas after it has gone through the turbine. This combined cycle activity maximizes the power output. Several PDC units can be coupled, directing all of their exhaust into the same channel, but operating asynchronously to produce a quasisteady exhaust flow. Correct coupling can also yield beneficial acoustic cancellations, reducing system noise.

Detonation can be initiated either directly or by deflagration flame acceleration followed by a deflagration-to-detonation transition (DDT) process. Direct detonation initiation energy and power requirements are a function of the cell size, or cell width, of a detonable mixture which is a measure of the combustion reaction rates of the fuel mixture. Cell size is measured from the characteristic diamond shaped pattern created during detonation. Sensitive mixtures that are easily detonated are characterized by small cell sizes and regular cell structures. Direct initiation of a planar detonation in a well-confined tube requires two-orders-of-magnitude less energy than initiation of spherical detonation in unconfined mixtures.

Approximate relationships between cell size and detonation propagation have been established. For detonations confined in tubes, the minimum tube diameter for stable propagation is the order of 1 to 3 cell widths. Natural gas has a detonation cell width of approximately 30 cm.

Pre-detonation tubes, explosive charges (e.g., tetryl), and high energy capacitive spark discharges have all been used to directly initiate detonation. A pre-detonation tube must be filled with a highly detonable mixture (e.g., hydrogen/oxygen) in which a detonation can be generated either directly or through a short DDT process. The distance required for DDT can be reduced by placing obstacles in the detonation tube to increase turbulence, create transverse pressure waves, and accelerate the DDT process. The detonation wave produced in the well-confined pre-detonation tube mixture can then be used to directly initiate detonation in the primary combustor. A detonation wave can be initiated by igniting a fuel/oxygen mixture in a small detonation tube which discharges into a primary combustor containing fuel/air. High voltage capacitive electrical spark ignitor systems can be used to deliver up to tens of Joules of energy in a single electrical discharge to ignite the pre-detonator mixture.

The detonation characteristics of natural gas (methane) can be elevated with the addition of propane or ethylene. A direct detonation initiator utilizing $H_2/O_2$ mixtures can be used. Detonation sensitivity and cell size are both functions of initial pressure.

It will be apparent to those skilled in the art that various modifications and variations can be made in the preferred detonation cycle of the present invention, without departing from the scope or the spirit of the invention. For example, several detonation process configurations are possible, depending on the conditions required to initiate detonation. By means of example and by no means to limit the present invention, three possible configurations include single-stage detonation initiation, multi-stage detonation initiation, and micro-stage detonation initiation.

One factor contributing to the characteristics of the detonation process is the method of fueling and selection of fuel. Liquid or gas fuel may be used in the present invention. Examples of liquid fuels which may be used in the present invention include, but are not limited to, coal slurry liquid hydrogen and liquid hydrocarbons. Solid fuel may also be used, for example, coal.

To ensure the optimum condition for fuel-air detonation, the fuel and air must be thoroughly mixed to ensure the fuel concentration is within the detonability limit (i.e., near stoichiometric). The components must be mixed to length scales comparable to the detonation phenomena length scales.

Mixing can be characterized on several levels including macroscopic and microscopic scales. Macroscopic mixing refers to the bulk fluid processes which bring the fuel and air components to close proximity (e.g., impingement of fuel and air streams). Microscopic mixing is the process by which the fuel and air are further mixed to a length scale required for detonation. Many techniques can be employed to produce microscopic mixing. However, care must be taken to minimize total pressure losses associated with these devices.

Several mixing strategies have been developed to ensure the necessary fuel-air conditions exist within the detonation combustors of the present invention. An air impingement device may be used to direct the air stream to mix with the fuel. The device would have a tapered surface so that the air introduced at a radially outward position is directed toward the fuel introduced at a radially inward position. It will be appreciated that the air impingement device also acts to direct air for "topping-off" the fueled combustor tube and for purging the combustor tube of remaining gases after firing.

Another mixing strategy involves mixing the fuel and air in a separate pre-mixer before injection of the fuel and air into the detonative combustors. The primary problem related to the pre-mixing concept is the potential of pre-ignition due to inadequate isolation of the mechanical elements of the combustor. A variation of this strategy is to partially pre-mix the fuel and air to a fuel concentration level just outside the fuel-air mixture's detonability limits.

Apparatus materials should be selected dependent upon anticipated operation conditions. It is expected that the engine material could be exposed to peak temperatures approaching 2500 K and peak pressures of the order of 20–40 atmospheres. Pressures just behind the detonation wave's shock front (i.e., in the ignition delay region) are of the order of 40 atmospheres, and pressure ratios across the entire detonation region are of the order of 20 atmospheres. The mode of operation will also expose the structure to periodic variations of both a thermal and mechanical nature.

Several methods for initiating a detonation cycle may be used. Detonation may be initiated by igniting a fuel-oxygen mixture in a small detonation tube which discharges into a combustor, or by igniting a fuel-oxidizer mixture co-located within the combustor. Alternatively, a high voltage electric discharge or pyrotechnic ignitor can be used. All three approaches may be effective given fuel detonation characteristics, certain energy and power constraints.

The small detonation tube method requires fuel, an oxidizer, pumps, high speed fluid valves, an electronic controller, a power supply and a spark generator. The direct electric discharge method requires a spark plug, electronic controller and a power supply. Pyrotechnic ignition is viable if a small solid rocket is fired systematically into each combustor (e.g., through a small rotor or cylinder valve) to initiate detonation.

The choice of ignition method is dependent on engine size and on the characteristics of the fuel used. In order to keep the design of the energy generating system as simple as possible, the direct electric discharge method coupled with a pre-detonator is preferred.

A pulse detonation energy generating system is provided by the invention. Such a system has at least one detonation combustor selectively coupled to an air inlet and fuel source. Fuel, air, and an oxidizer can be fed to the detonation combustors either through a rotary valve or through a conically shaped injector head. Energy generated by detonating fuel, air and oxidant is converted to electrical energy.

The pulse detonation energy generator includes at least one detonation chamber. Each detonation chamber has an inlet end and an outlet end. A fuel manifold supplies fuel from a fuel source to the two or more detonation chambers at the inlet ends. An inlet air duct manifold supplies air to the two or more detonation chambers at the inlet ends. A means for initiating detonation is in the detonation chamber. A means for converting is included to convert into electrical energy the energy cogenerated by a detonation in the detonation chamber.

The pulse detonation energy generator may further include a rotor disk valve having at least one opening and at least one solid portion, wherein the rotor disk valve is positioned between the inlet ends of the detonation chambers and the fuel and air manifolds. The rotor disk valve rotates so that the opening is positioned over the inlet end of one of the at least two detonation chambers to allow fuel and air to enter the detonation chamber. The rotor disk valve further rotates so that the solid portion is positioned over the inlet end of the detonation chamber so that the fuel and air inside the detonation chamber can be detonated by the detonation source. The fuel source can be a solid fuel source, a liquid fuel source, or a gas fuel source.

The pulse detonation energy generator may further include a predetonator having a separate predetonation tube fueled with fuel and an oxidizer and is constructed to fire into the one or more detonation chambers to initiate detonation. The energy conversion means can include a jacket disposed around the detonation chamber to enclose an energy transfer medium. The energy transfer medium can be a gas, such as air, or a liquid. An electrical generator can be powered by the energy transfer medium.

Two modes of producing a detonation wave are possible: (1) direct detonation initiation, and (2) initiation of a deflagration followed by a deflagration-to-detonation transition (DDT) process. In the first method, explosives, pyrotechnics, laser, plasma torch, arc jet, sparks, or predetonator tubes are used to instantly initiate a detonation at the ignition source. A pre-detonator consists of a co-located tube containing an easily detonable mixture, such as fuel/oxygen. A detonation that is initiated in the pre-detonator will travel into the less detonable primary mixture (e.g., fuel/air) and initiate a detonation. ASI regularly utilizes the pre-detonator concept for aerospace propulsive pulse detonation engine (PDE) applications.

The required initiation energy ($E_{crit}$) for direct detonation is relatable to cell size $\lambda$ using the following approximate relations:

| | |
|---|---|
| $E_{crit} \, \alpha \, \lambda 3$ | Unconfined spherical detonation |
| $E_{crit} \, \alpha \, \lambda 3$ | Confined planar detonation |

Fuel/oxygen mixtures typically have detonation initiation energies that are orders of magnitude less than corresponding fuel/air mixtures, greatly improving the detonability of the fuel. Power requirements must also be met, i.e., the energy must be delivered in a short enough time to preclude the formation of a deflagration wave.

Confinement is also an issue for direct detonation initiation. If the tube diameter is too small, boundary effects and losses will inhibit the formation and propagation of a detonation wave. As the diameter increases, the degree of confinement of the mixture decreases, and the reflection of detonation wave-augmenting pressure waves from the walls diminishes. Poorly confined mixtures do not benefit from pressure and shock wave reflection, and require higher direct detonation energies. A detonation can be considered confined if the tube diameter is less than $13\lambda$.

The second method of detonation initiation is through deflagration to detonation transition (DDT). In this process, a conventional ignition source initiates a deflagration wave in the mixture which quickly accelerates (under the proper conditions) to a velocity where transition into a detonation wave occurs. The transition distance is influenced by many factors, including the type of fuel, fuel concentration, initial thermodynamic and fluid state (e.g., mean flow and turbulence characteristics), ignition source characteristics, and geometric properties of the detonation chamber (e.g., diameter, length, wall roughness). Minimizing DDT distance has been one of the most fundamental elements of Applicant's pulse detonation research, as the volume of fuel deflagrated has a direct impact on constant volume combustion gains. A short DDT distance also serves to minimize the required length, weight, and cost of individual detonation combustors.

The DDT distance can be reduced using both mechanical and chemical methods. One mechanical strategy is the placement of obstacles in the detonation tube to increase turbulence, create transverse pressure waves, and accelerate the DDT process. The characteristic dimensions and placement of these DDT enhancing obstacles can be optimized for a given fuel and tube geometry. Chemical sensitization can also be used to accelerate the DDT process and minimize the initiation energy and power required to detonate a particular mixture. Chemical sensitizers include oxidizers and other fuels.

Figure 6:
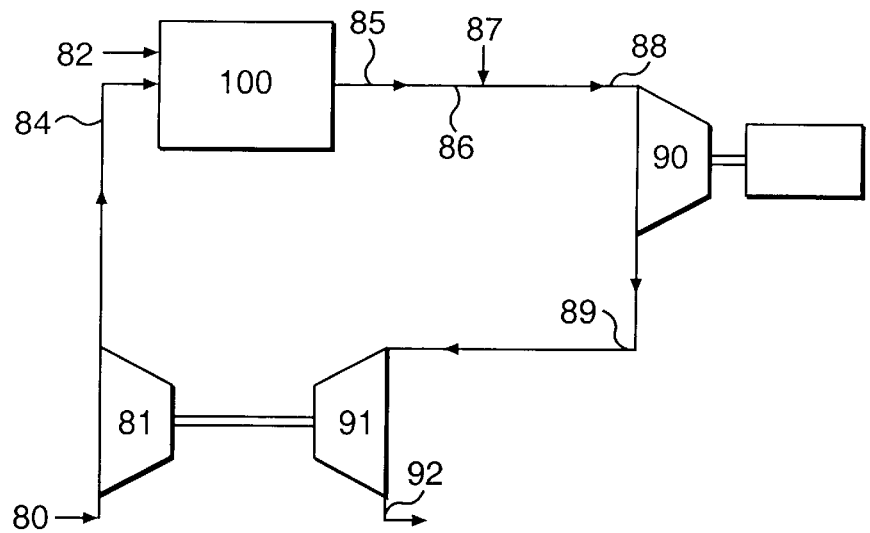
FIG. 6 is a schematic diagram of one embodiment of the PDC cycle with quenching steam or water added after the blow down process.

FIG. 6 shows one possible configuration for a qualitative PDC cycle. The figure models one embodiment in which the PDC 100 is part of a combined cycle natural gas power plant. It is understood that different configurations for different fuels are well within the scope of the invention. Air 80 passes from the ambient conditions through a compressor 81, where it is brought to a higher pressure via an isentropic process. The air mixes with a fuel 82 and detonates in the PDC 100, simulating constant volume heat addition between states 84 and 85. Products reside at the wall-stagnation values typical to the pulse detonation combustor at state 85. The products then expand isentropically out of the combustor as flow work is done by the fluid from states 85 to 86.

Due to the high temperatures of detonative combustion, the products at state 86 will be at a temperature that is beyond that current turbine materials limits. Steam (or water) 87 is therefore added via a constant pressure mass addition between states 86 and 88. The addition of $H_2O$ to the flow at this stage will also quench the exhaust so that $NO_x$ production mechanisms are slowed to acceptable rates. A majority of the lost enthalpy between these two stages would be recovered as useful work due to the extra steam mass flowing through the turbine 90 at very high temperatures (i.e., near turbine materials limits), thereby increasing the PDC power.

A high pressure power turbine 90 extracts useful work from the combustion products between states 88 and 89, and a low pressure turbine 91 (matched to deliver power to the compressor 81) lowers the exhaust enthalpy even further between stage 89 and 92. Finally, the spent gases are released to the atmosphere (after possible stack and/or flue gas clean-up stages). Many options are available for the exhaust cooling and expansion stages, including heat recovery to a highly efficient steam cycle.

Figure 7:
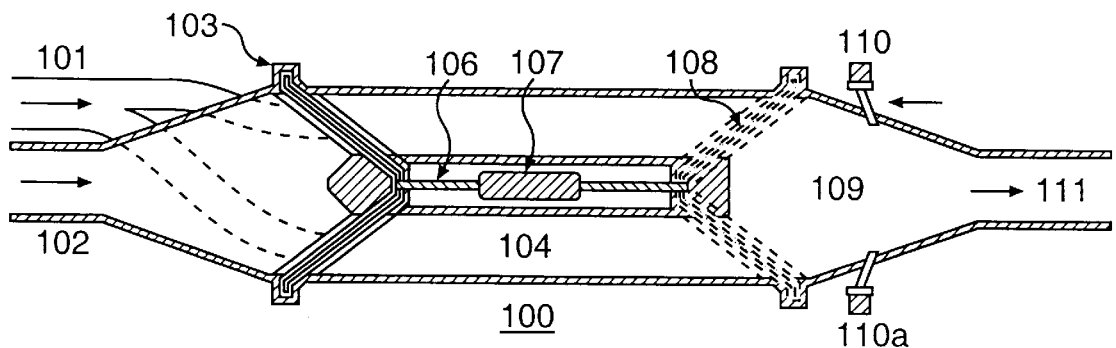
FIG. 7 is an illustration of a pulse detonation combustor in cross sectional view.

FIG. 7 illustrates one embodiment of a pulse detonation combustor (PDC) of the present invention. Fuel and oxygen enter the combustor 100 through manifolds 101. Inlet air from a compressor (not shown) enters through air manifold 102. These materials enter the detonation chamber 104 through rotary valve 103. The embodiment in FIG. 7 shows a conical rotary valve, however other shapes for the rotary valve (e.g. disk) are well within the scope of the invention. The rotary valve 103 is controlled by drive shaft 106 which is connected to motor assembly 107. An optional rear rotary valve 108 is shown by dotted lines which can be engaged to prevent back propagation. Upon exiting the combustion chamber 104, the combustion products would enter a plenum 109. At this point post-combustion injectors 110 and 110a function to inject steam or liquid $H_2O$ into the plenum 109. All products then exit the detonation combustor through nozzle 111 to a turbine (not shown). A co-located or separate pre-detonation chamber (not shown) serves to directly initiate the primary detonation of the fuel/air mixture in the main chamber. The fuel and air would be metered by a rotary valve (other valve arrangements are possible, e.g., flapper, fast-acting ball valve, butterfly valve, electrically activated solenoid, etc.) whose conical shape minimizes stagnation flow losses in the inlet. Steam (or water) injectors are positioned downstream of the detonation region to quickly quench the exhaust to turbine materials temperatures, freeze $NO_x$ production, and increase the power output.

Figure 8:
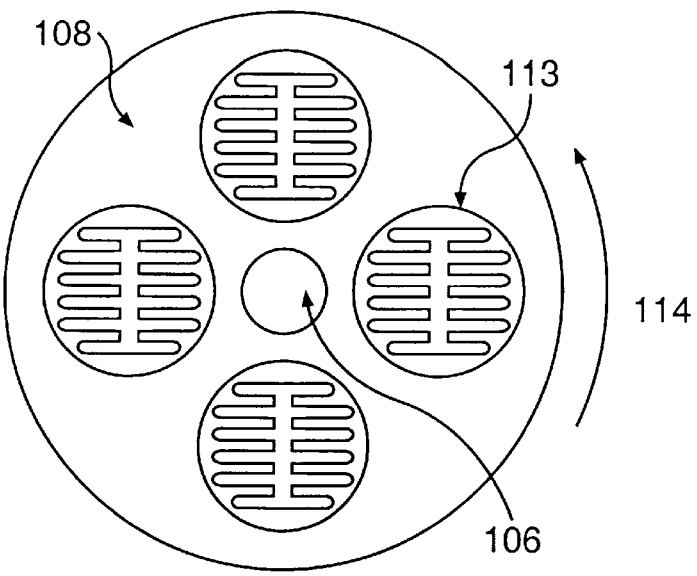
FIG. 8 is a rear view of the pulse detonation combustor.

FIG. 8 shows a rear view of the PDC. Conical rotor 108 is shown with a plurality of exit chambers 113. 114 shows the direction of rotor rotation. This rotation is about the drive shaft 106. This configuration allows for detonation tube 105 to be variously closed and opened during detonation/exhaust. With renewed reference to FIG. 7, the rotary valve 103 may serve several functions, including initially admitting only air to purge the system of hot gases, introducing both fuel and air for primary detonation, and introducing fuel and oxygen for the pre-detonator. Of course, the fuel and oxygen may also be controlled by any suitable valve system. Once the main combustion chamber 104 is fueled, the valve 103 would be closed and the mixture detonated. The rotary valve 103 is mechanically simple and easily controlled, allowing the frequency of combustion to be closely regulated. The result is a combustor that may be quickly throttled for optimal operation of the plant. Additionally, the valve allows unsteady combustion to occur with steady fuel and air manifolds. The number of chambers required for optimal operation is dictated by the fill and fire times of the individual detonation chambers (this case shows 2 sets of chambers, each with 2 tubes filling/firing synchronously). Applicant has gained significant experience in pulse detonation engine configuration design, timing, and operational strategies through on-going aerospace propulsion activities.

Figure 9:
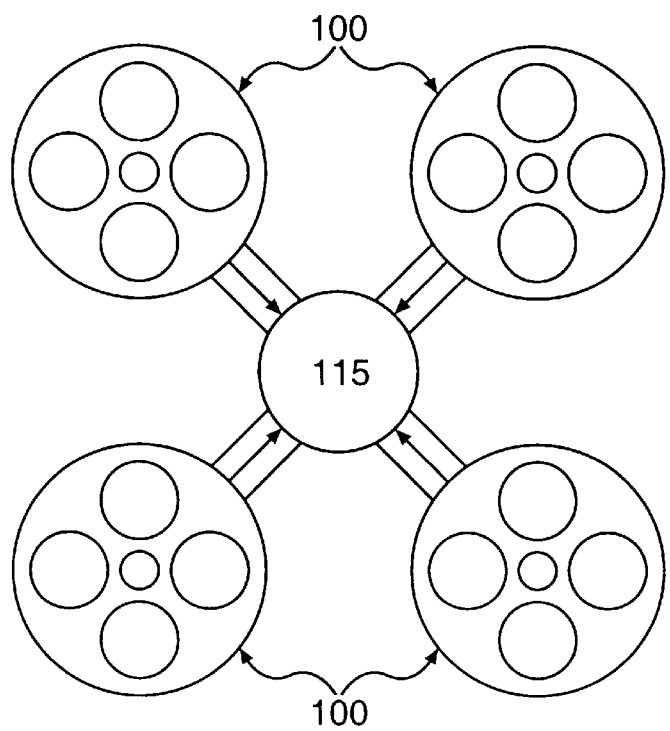
FIG. 9 is an illustration of multiple pulse detonation combustors coupled to a single turbine.

FIG. 9 demonstrates one embodiment in which multiple pulse detonation chambers 100 are connected to a single turbine 115. Delivering steady flow to the turbine 115 is one issue which must be resolved to maximize the duty life of the turbine components. By operating multiple PDCs asynchronously, pressure wave cancellation and dissipation will occur, as shown in FIG. 9 resulting in quasi-steady flow to the turbine.

The previously mentioned lower $No_x$ production is partly due to the greater efficiency achievable with the PDC. This high efficiency would allow a reduction in fuel use, and thus fewer exhaust products of any form would be produced in the generation of the same amount of energy. Detonation is also expected to achieve high combustion efficiency (as opposed to cycle efficiency), leaving less oxygen with which the nitrogen can react. The high combustion efficiency should yield less of the hydrocarbon radicals that lead to $No_x$ production via the prompt mechanism.

The pulse detonation combustor (PDC) can substantially improve natural gas combustion thermal efficiency by approximately 15 percent to 30 percent as compared to current or projected natural gas combustors, such as steady state and pulse combustors. The natural gas combustor detonates a natural gas/air mixture with a pre-detonation system. Detonating the fuel/air mixture greatly improves the thermal efficiency of the combustion heat release process compared to deflagrative combustion. The high efficiency of detonation combustion results from the fact that it is a constant volume process, unlike deflagrative combustion which is a constant pressure process.

The detonation combustor is mechanically simple, compact, produces reduced levels of $NO_x$, has improved heat transfer capabilities, and is extremely efficient.

Figure 10:
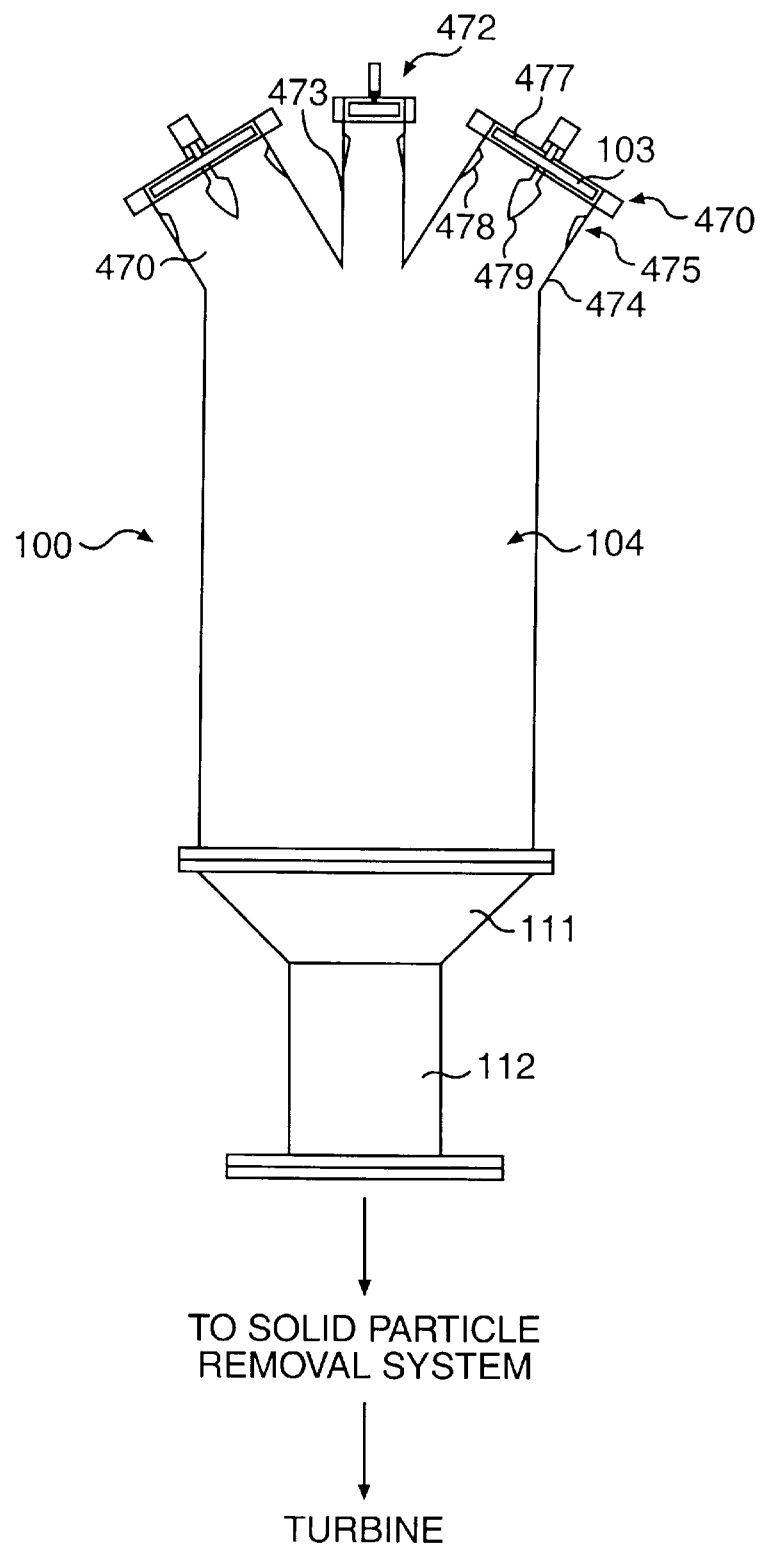
FIG. 10 shows a side view of one embodiment of a pulse detonation combustor.

FIG. 10, in which like reference numerals refer to like elements shown in the other drawings, illustrates an alternative embodiment of a pulse detonation combustor (PDC) device 100. The basic components include the fuel/air injector valves 103 and mixing chambers 470, the detonation initiator 472, the primary combustion chamber 104, and the nozzle/exhaust mechanism. The pre-detonation chamber 472 serves to directly initiate the primary detonation of the fuel/air mixture in the main chamber 104. Separate from the predetonator 472, the fuel and air is metered by a rotary valve 103 (other valve arrangement are possible, e.g., flapper, fast-acting ball valve, electrically activated solenoid) and injected into the fuel/air mixing chamber 470 where they are mixed to the microscopic length scales required for detonation by impingement mixers.

Figure 11:
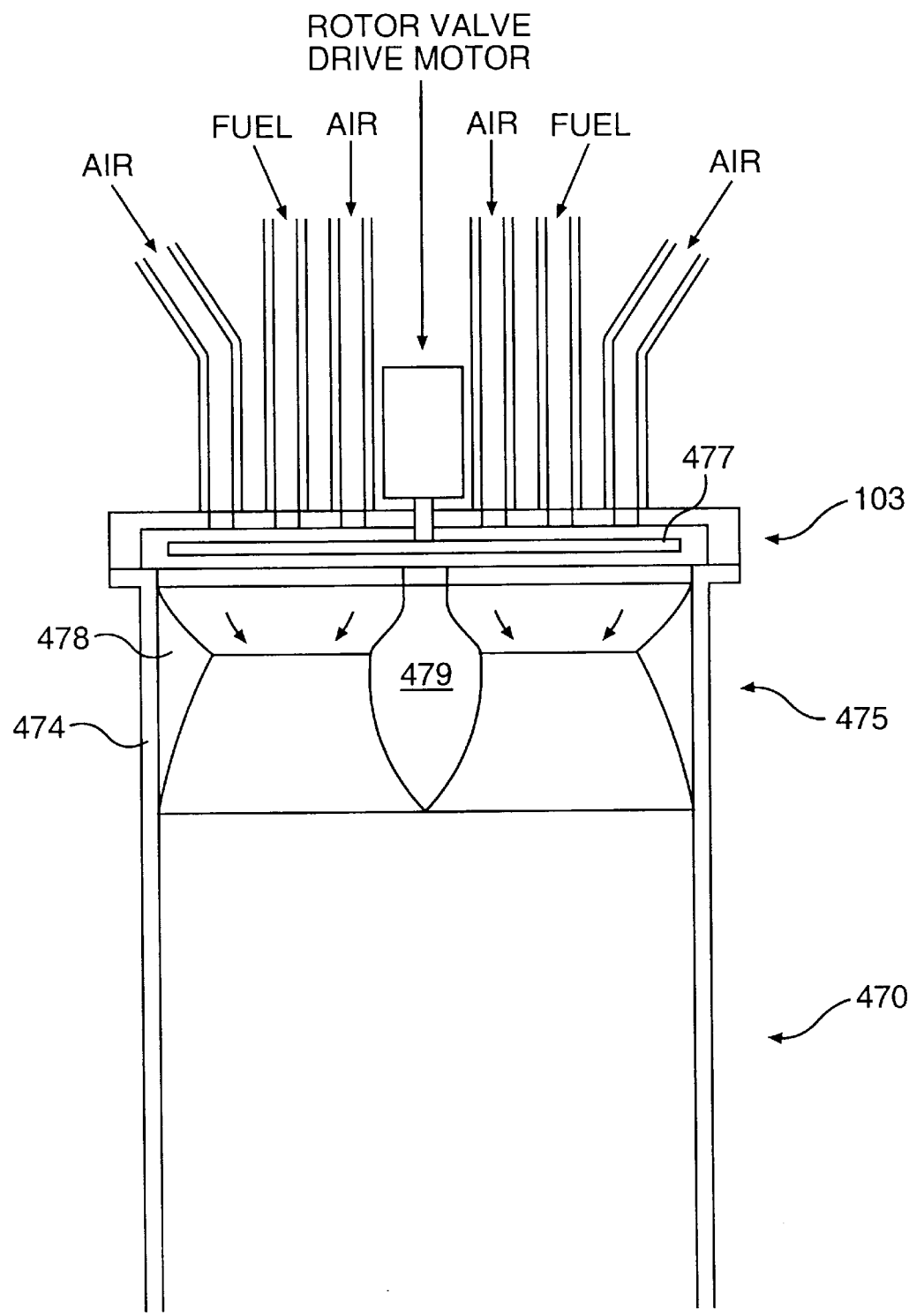
FIG. 11 shows a cross-sectional view of one embodiment of a rotor valve drive motor.
Figure 12:
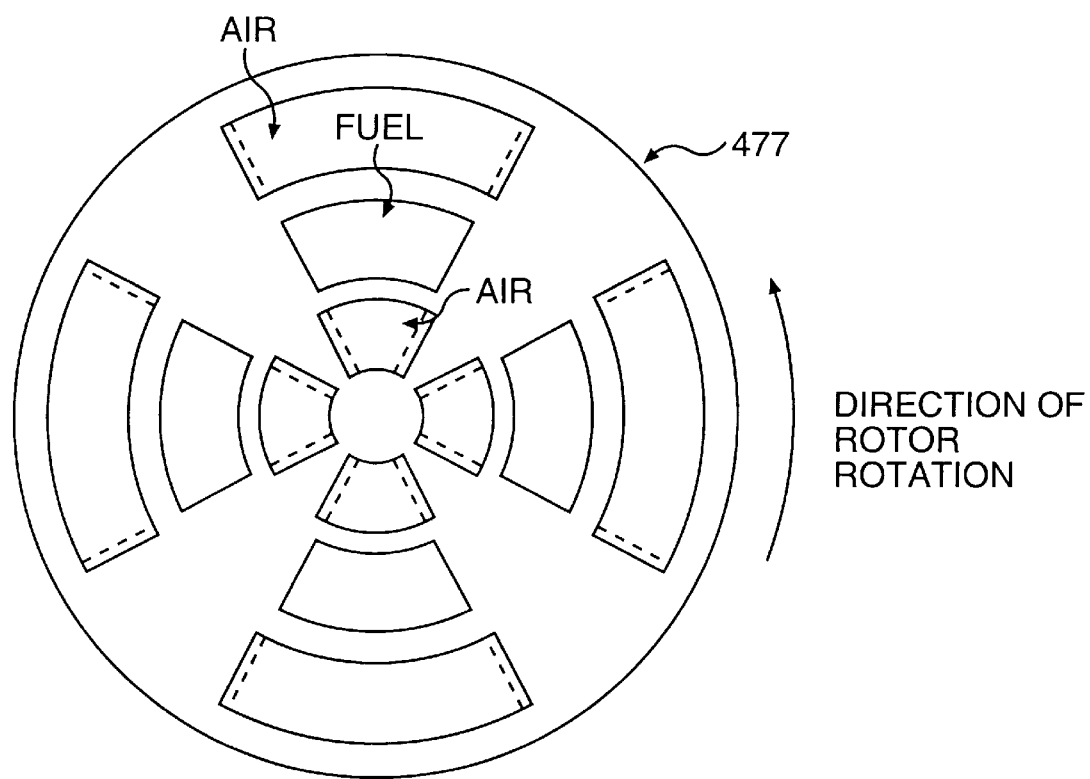
FIG. 12 shows a cross-sectional view of one embodiment of a primary fueling port.

FIG. 11, in which like reference numerals refer to like elements shown in the other drawings, shows a side view of a fuel/air injector/mixer 474. The impingement mixers 475 include an impingement ring 478 and center lobe 479 which force air into the fuel stream. Microscopic mixing occurs through the multiple fuel and air injector ports in the rotary valve assembly 103. The rotary valve serves several functions, including initially admitting only air to purge the system of hot gases, introducing both fuel and air for primary detonation, and finally admitting an air buffer to "top off" the injector/mixer in order to isolate the rotor assembly from the detonation wave. To accomplish these different fueling states, the rotary valve disk 477 has a series of different sized openings. Each is sized to accomplish its particular function. FIG. 12, in which like reference numerals refer to like elements shown in the other drawings, illustrates a rotary valve disk 477 for a four port injection system. Once the main combustion chamber is fueled, the valve is closed and the mixture detonated. The rotary valve is 103 mechanically simple and easily controlled, allowing the frequency of the combustion to be closely regulated.

Figure 13:
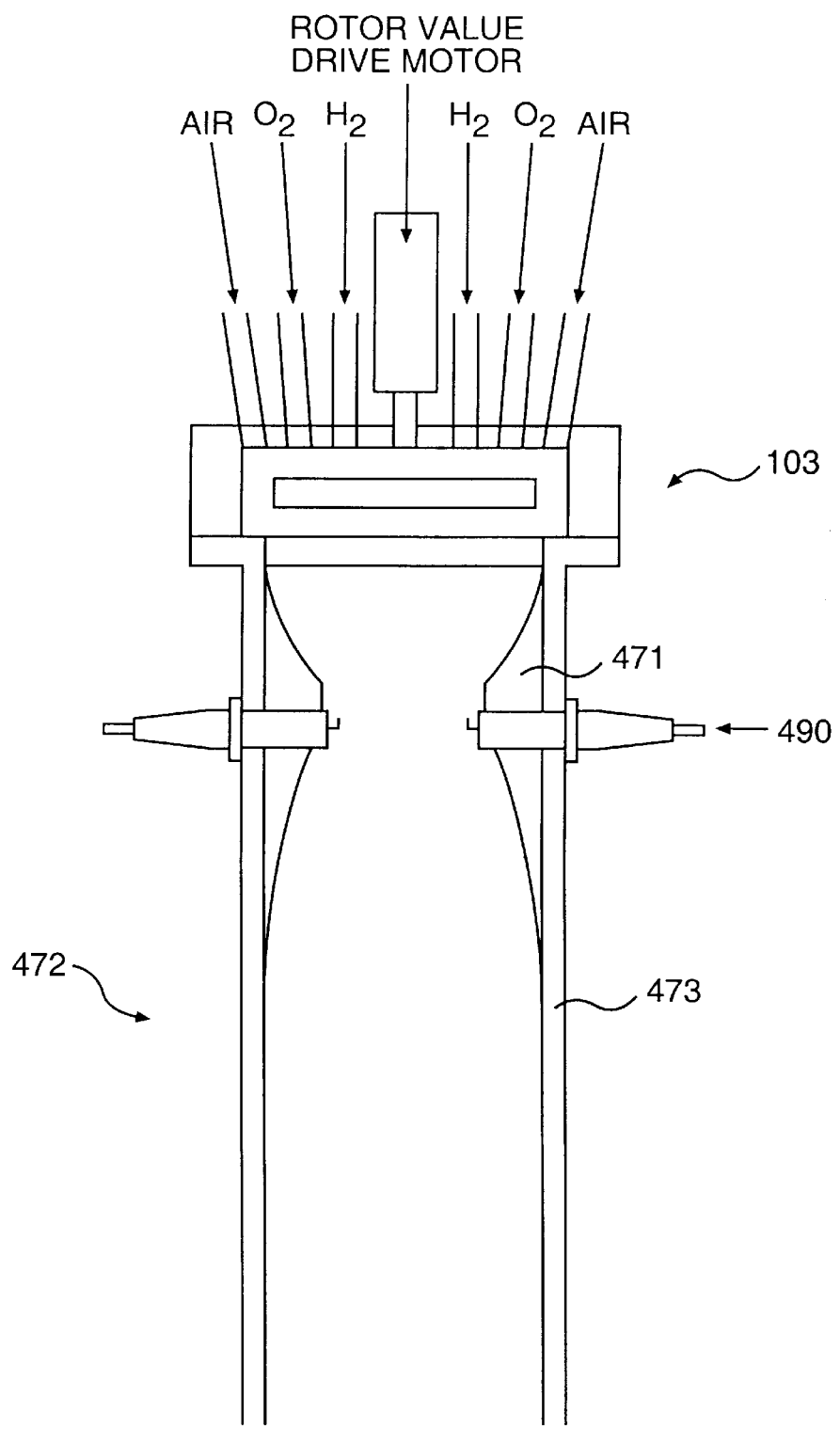
FIG. 13 shows a cross-sectional view of one embodiment of a pre-detonation chamber.

Detonation is initiated in the device with a pre-detonator, or a tube extension in which deflagration-to-detonation transition (DDT) can take place. A pre-detonator is positioned before the main detonation chamber 104. FIG. 13, in which like reference numerals refer to like elements shown in the other drawings, depicts a pre-detonator 472 which uses a rotary valve 480 for flow metering. The detonation initiation tube 473 contains a highly sensitive (i.e., readily detonatable) mixture such as hydrogen and oxygen.

Figure 14:
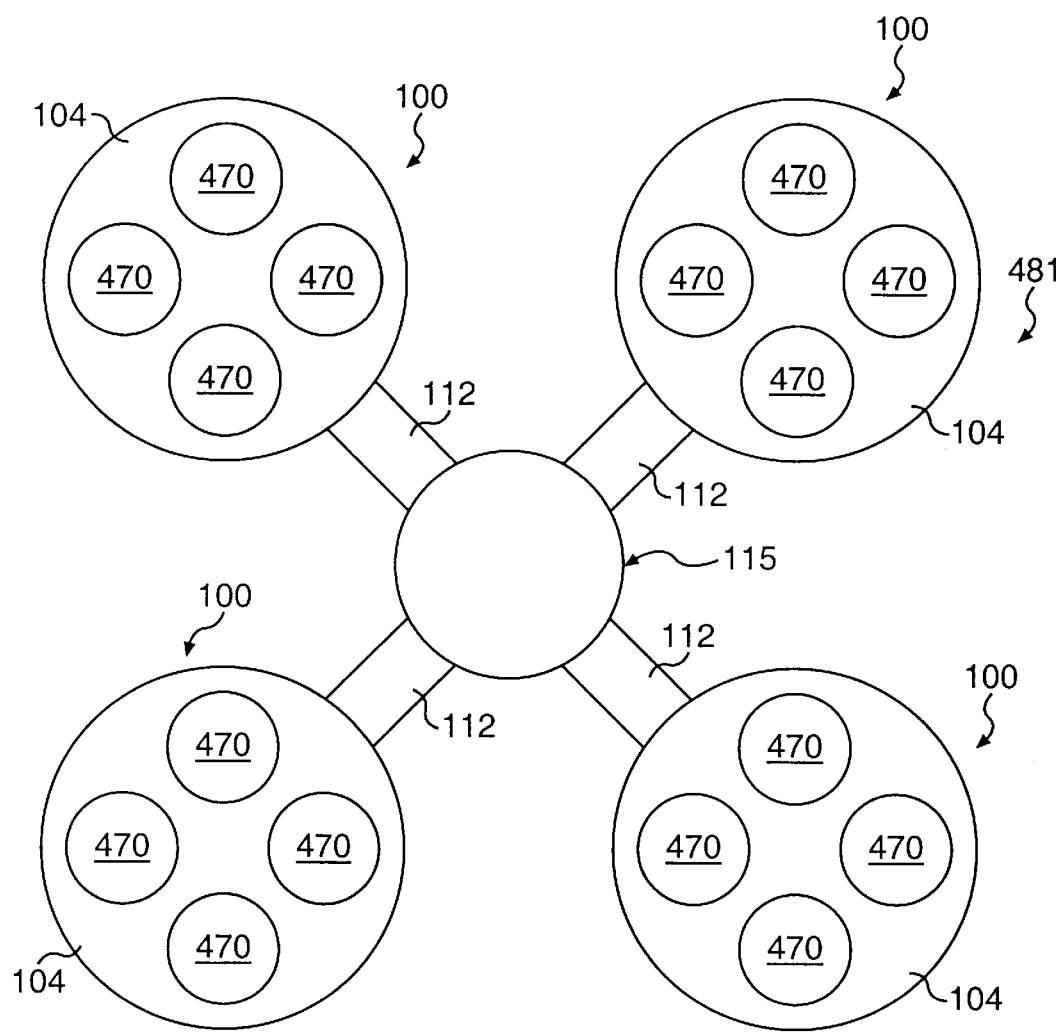
FIG. 14 shows a top view of one embodiment of multiple pulse detonation combustors driving a common turbine.

With renewed reference to FIG. 10, the hot gases, during operation of the device 100, expand out of the combustion chamber 104 through a nozzle 111 and progress through a conduit 112 to a turbine (not shown), which generates electricity. If the temperature is excessive for optimal turbine operation, a heat exchanger is coupled to this conduit to transfer some of the heat to steam. A steam turbine can then be utilized to recover useful energy from the steam. A similar device is used to capture any heat remaining in the exhaust gas after it has gone through the turbine. This combined cycle activity maximizes the power output. With reference to FIG. 14, in which like reference numerals refer to like elements shown in the other drawings, several PDC units can be coupled, directing all of their exhaust through conduits 112 into the same channel, but operating asynchronously to produce a quasisteady exhaust flow. Correct coupling can also yield beneficial acoustic cancellations, reducing system noise. FIG. 14 illustrates such a multi-pulse detonation combustor 481 having four PDC's 100 coupled to a single turbine 115.

Detonation can be initiated either directly or by deflagration flame acceleration followed by a deflagration-to-detonation transition (DDT) process. Direct detonation initiation energy and power requirements are a function of the cell size, or cell width, of a mixture capable of detonation, which is a measure of the combustion reaction rates of the fuel mixture. Cell size is measured from the characteristic diamond shaped pattern created during detonation. Sensitive mixtures that are easily detonated are characterized by small cell sizes and regular cell structures. Direct initiation of a planar detonation in a well-confined tube requires two orders-of-magnitude less energy than initiation of spherical detonation in unconfined mixtures.

Approximate relationships between cell size and detonation propagation have been established. For detonations confined in tubes, the minimum tube diameter for stable propagation is the order of 1 to 3 cell widths. Natural gas has a detonation cell width of approximately 30 cm.

Several researchers have experimentally measured the cell size and direct detonation initiation energy requirements for a variety of fuel/oxidizer mixtures. The cell size and the minimum energy required for direct detonation initiation for acetylene/air, hydrogen/air, ethylene/air and for several dense hydrocarbon/air mixtures is known. Minimum energies are approximately 128 Joules for acetylene/air, 4 KJ for hydrogen/air, 30 KJ for ethylene/air, and 260 KJ for several dense hydrocarbon/air mixtures. Hydrogen/oxygen detonation initiation energies require approximately 3 Joules to directly detonate the mixture. Therefore, approximately 3 orders of magnitude more energy is required to initiate hydrogen/air than hydrogen/oxygen. This trend has been found to be true for most fuel/air vs. fuel/oxygen mixtures. It is desirable to use the low detonation initiation energy requirements of sensitizers such as oxygen or more detonatable fuels to enhance the overall detonatability of fuel/air mixtures.

With renewed reference to FIG. 13, tubes, explosive charges (e.g., tetryl), and high energy capacitive spark discharges have all been used to directly initiate detonation. A pre-detonation tube 473 must be filled with a highly detonatable mixture (e.g., hydrogen/oxygen) in which a detonation can be generated either directly or through a short DDT process. The distance required for DDT can be reduced by placing obstacles 471 in the detonation tube to increase turbulence, create transverse pressure waves, and accelerate the DDT process. The detonation wave produced in the well-confined pre-detonation tube mixture can then be used to directly initiate detonation in the primary combustor. A detonation wave can be initiated by igniting a fuel/oxygen mixture in a small detonation tube 473 which discharges into a primary combustor containing fuel/air. High voltage capacitive electrical spark ignitor systems 490 can be used to deliver up to tens of Joules of energy in a single electrical discharge to ignite the pre-detonator mixture.

The detonation characteristics of natural gas (methane) can be elevated. Methane, propane or ethylene can be added to sensitize the mixture.

Single detonations utilizing methane/air mixtures can be conducted. A direct detonation initiator utilizing $H_2/O_2$ mixtures can be used. Detonation sensitivity and cell size are both functions of initial pressure.

Figure 15:
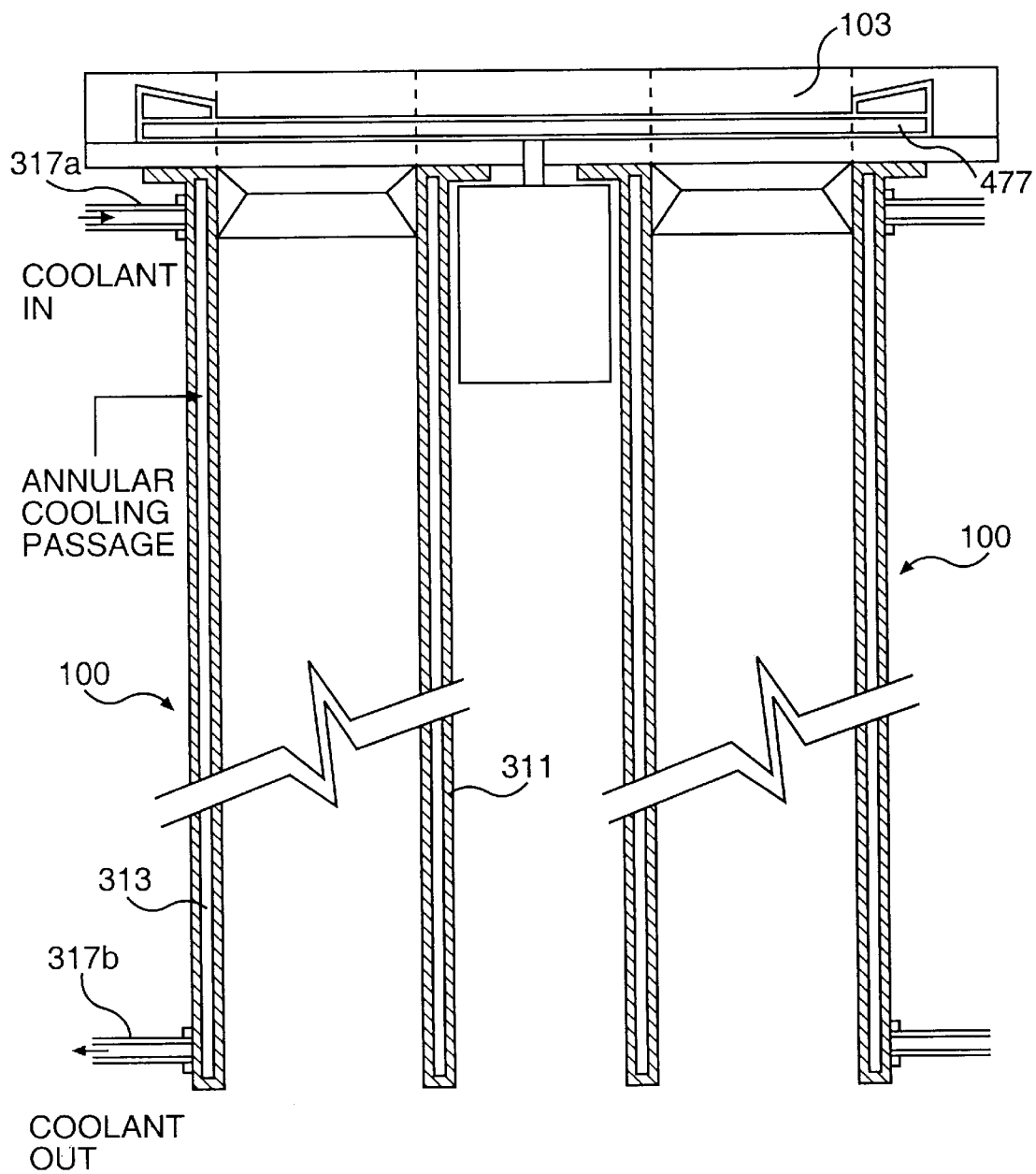
FIG. 15 shows a cross-sectional view of an embodiment of the invention in which a coolant jacket surrounds each pulse detonation combustor.
Figure 16:
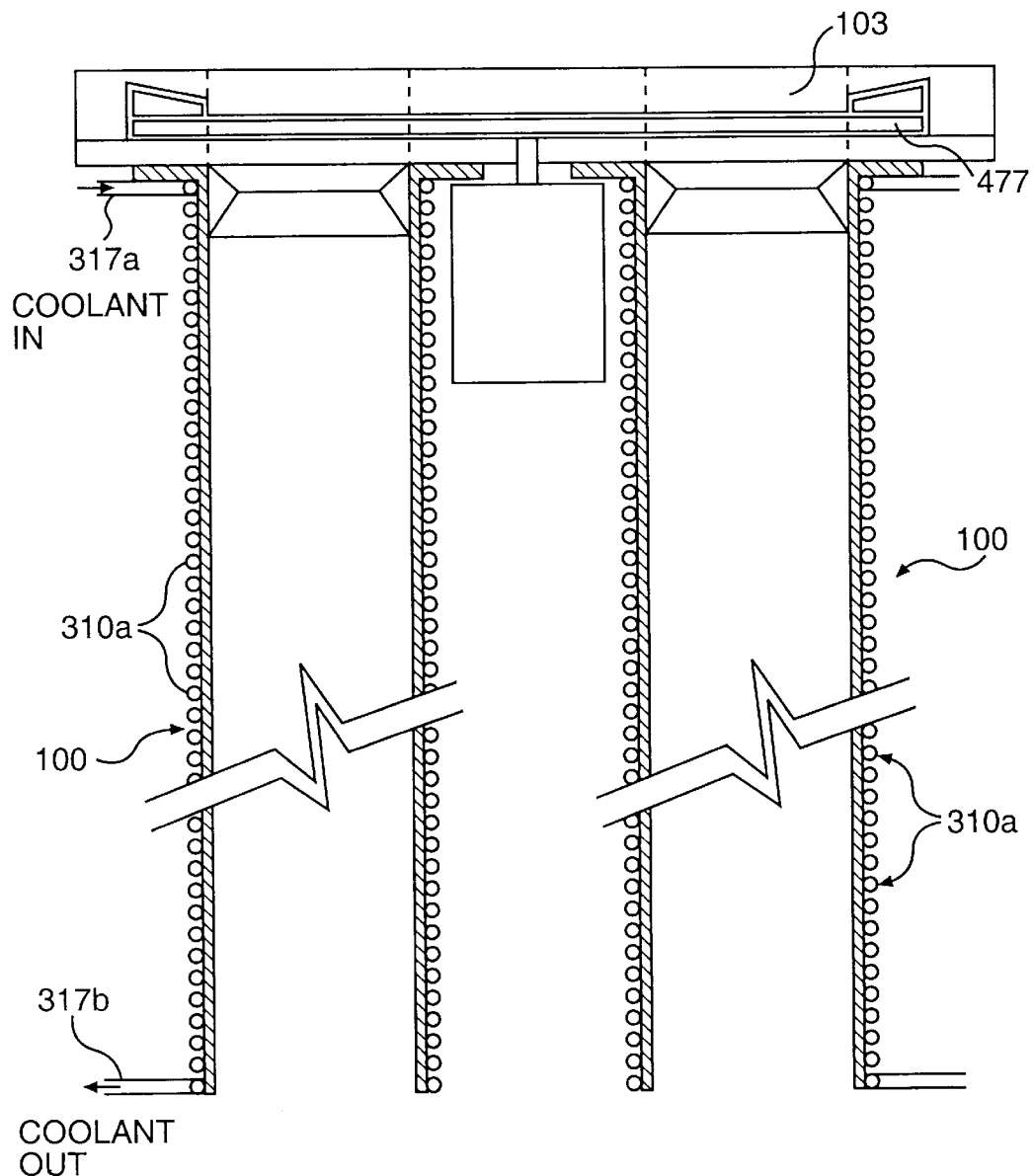
FIG. 16 shows a cross-sectional view of an alternative embodiment of the invention in which a coolant jacket surrounds each pulse detonation combustor.

Other constructions of the PDC combustors 100 are within the scope of the present invention. For example, as shown in FIGS. 15 and 16, in which like reference numerals refer to like elements shown in the other drawings each combustor 100 can include means for preventing heat degradation of the interior of the combustors, such as active cooling means, passive cooling means, or combinations of active and passive cooling means. Referring now to FIG. 15, there is illustrated therein an embodiment of the pulse detonation engine in which combustors 100 include means for actively cooling each combustor. Disposed around the outside of each combustor 100 is a tube or sheath 311 concentrically disposed therearound and defining an annular cooling channel region 313. The second tube 311 and the wall of the combustor 100 are operatively disposed so as to define a cooling region 313 through which a coolant medium is adapted to circulate.

The coolant medium is adapted to be circulated between and around the combustor 100 removing heat from the immediately contracting interior region of the combustor 100. More specifically, the cooling channel region 313 is adapted to provide for the circulation of a coolant medium by a coolant pump (not shown) to maintain the combustor 100 at a uniform, relatively low temperature for preventing catastrophic failure of the combustion chamber walls, or pre-ignition of the fuel/air mixture. Coolant is allowed into and exhausted from the cooling channel region 313 by means of a coolant inlet portion 317a and a coolant outlet port 317b. Coolant is pumped in via coolant port 317a from a reservoir of coolant (not shown).

An active embodiment is illustrated in FIG. 16, wherein the active cooling means consists of a relatively small tube 310a wrapped helically around the combustor 100 through which the cooling medium circulates. As with the embodiment of FIG. 15, coolant is allowed into and exhausted from the cooling region 313 by means of a coolant inlet port 317a and a coolant outlet port 317b. Coolant is pumped in via coolant port 317a from a reservoir of coolant (not shown).

The coolant medium employed in the device can be either a gaseous or liquid coolant, and can vary depending upon, for example, combustion temperature, the width of the channel region 313 or diameter of tube 310a, and the degree of cooling required. In one preferred embodiment, the coolant is a liquid or gas coolant which is the same as the fuel used to fuel the combustion chambers. In the embodiment, a synergistic effect of preheating the fuel prior to being introduced into the detonation chamber is present and provides for more efficient use of fuel, since fuel temperature is closer in the detonation temperature resulting in more efficient consumption of the fuel during detonation. The concentrically disposed sheath 311 is affixed to the detonation chamber at the top and bottom thereof to assure that no coolant material is allowed to leak out. This embodiment can be used advantageously in reusable engine applications.

It will be apparent to those skilled in the art that various modifications and variations can be made in the construction and configuration of the present invention without departing from the scope or spirit of the invention. For example, the embodiments mentioned above are illustrative and explanatory only. Various changes can be made in the raw material reactants, the detonable mixtures, as well as the configuration of the device to engineer the energy generation to specific desired outcomes. Further, it may be appropriate to make additional modifications, such as the use of sensitizers, and other components, depending on the parameters sought to be achieved by the process. Thus it is intended that the present invention cover the modifications and variations of the invention, provided they come within the scope of the appended claims and their equivalents.

What is claimed is:

1. A pulse detonation energy generator adapted to produce combustion products having kinetic and thermal energy as a result of a detonation, said generator comprising:
    a detonation chamber having a fuel inlet, an air inlet, and a combustion product outlet;
    means for pulse feeding air through the detonation chamber air inlet and into the detonation chamber, said means for pulse feeding air comprising a rotor valve;
    means for feeding fuel into the detonation chamber;
    means for initiating detonation in the detonation chamber, said initiating means comprising a predetonator;
    means for injecting liquid water or steam into the detonation combustion products; and
    means for converting the kinetic energy of the combustion products into electrical energy.

2. The pulse detonation energy generator of claim 1 wherein said rotor valve comprises a rotor disk valve.

3. The pulse detonation energy generator of claim 1 further comprising means for converting the thermal energy of the combustion products into electrical energy.

4. The pulse detonation energy generator of claim 3 wherein said thermal energy converting means comprises a jacket disposed around the detonation chamber and enclosing an energy transfer medium.

5. The pulse detonation energy generator of claim 1 further comprising a fuel/air mixing chamber disposed between said fuel source and said detonation chamber.

6. A pulse detonation energy generator, comprising:
    at least one detonation chamber having an inlet end and an outlet end;
    a fuel source for supplying fuel to said at least one detonation chamber;
    an air manifold for supplying air to said at least one detonation chamber;
    a rotor valve between the air manifold and said at least one chamber;
    means for initiating detonation in said at least one detonation chamber to thereby form detonation combustion products having kinetic and thermal energy, wherein said means for initiating detonation comprises a predetonator; and
    means for injecting liquid water or steam into the detonation combustion products prior to driving a turbine;
    means for converting the thermal energy released by a detonation in said at least one detonation chamber into electrical energy, said energy converting means comprising a jacket disposed around a detonation chamber and enclosing an energy transfer medium.

7. The pulse detonation energy generator of claim 6 wherein said rotor valve comprises a rotor disk valve.

8. The pulse detonation energy generator of claim 6, further comprising a fuel/air mixing chamber disposed between said fuel source and said detonation chamber.

* * * * *